United States Patent [19]
Obst

[11] Patent Number: 4,936,547
[45] Date of Patent: Jun. 26, 1990

[54] ECCENTRIC BALL VALVE

[75] Inventor: Ricahrd G. Obst, Northboro, Mass.

[73] Assignee: Worcester Controls Corporation, Marlborough, Mass.

[21] Appl. No.: 448,411

[22] Filed: Dec. 11, 1989

[51] Int. Cl.⁵ .............................................. F16K 5/06
[52] U.S. Cl. ..................................... 251/315; 251/304
[58] Field of Search ............... 251/160, 162, 163, 304, 251/315

[56] References Cited

U.S. PATENT DOCUMENTS

| | | |
|---|---|---|
| 3,064,937 | 11/1962 | Pryor . |
| 3,124,333 | 3/1964 | Sivyer . |
| 3,191,906 | 6/1965 | Zeigler et al. . |
| 3,410,523 | 11/1968 | Kelly et al. . |
| 3,809,361 | 5/1974 | Pfundstein et al. . |
| 3,946,986 | 3/1976 | Sutter et al. . |
| 4,073,473 | 2/1978 | Rihm et al. . |
| 4,074,889 | 2/1978 | Engel . |
| 4,118,008 | 10/1978 | Myers . |
| 4,121,607 | 10/1978 | Bader . |
| 4,215,846 | 8/1980 | Ishizuka et al. . |
| 4,640,492 | 2/1987 | Carlson . |
| 4,822,000 | 4/1989 | Bramblet . |

FOREIGN PATENT DOCUMENTS

| | | |
|---|---|---|
| 2428516 | 1/1975 | Fed. Rep. of Germany . |
| 474270 | 9/1952 | Italy . |
| 2000574 | 1/1979 | United Kingdom . |

Primary Examiner—John C. Fox
Attorney, Agent, or Firm—Pollock, VandeSande and Priddy

[57] ABSTRACT

A ball valve of the type comprising a housing having a ball mounted for 90° rotation therein between open and closed valve positions utilizes a ball whose exterior surface is shaped to define two noncoaxial hemispherical surface portions of like size and shape that are integrated with one another and offset from one another along a plane that is oriented at substantially 45° to an axially directed bore in the ball. The hemispherical surface portions of the ball are in touching engagement with a pair of annular seat rings in the housing in the open position of the valve, and engage the seat rings with increasing force as the ball is rotated from the open position to the closed position of the valve.

14 Claims, 3 Drawing Sheets

ECCENTRIC BALL VALVE

BACKGROUND OF THE INVENTION

The present invention relates to ball valves used to control the flow of fluids, and is more particularly concerned with a novel ball configuration which exerts a reduced force against the valve seats when the ball is in its open position in the valve, thereby increasing the life of the seats used in such valves.

Ball valves are in themselves well known in the art, and commonly comprise a housing or valve body having an interior cavity located between and communicating with a pair of fluid flow channels to define an axial flow passage extending through the housing. A ball is located in the cavity and is provided with an axially directed bore extending therethrough which car be selectively aligned with, or disposed transverse to, the axial flow passage in the housing by rotation of the ball through, e.g., 90°, thereby to control the flow of fluid through the axial flow passage. A pair of annular seat rings are supported by the housing in surrounding relation to the axial flow passage adjacent the upstream and downstream sides of the housing cavity, the seats being in sealing engagement with both the housing and the ball.

In valve arrangements of the aforementioned type seat life has been a problem. Since the ball is normally in sealing engagement with the seats in both the open and closed position of the ball, the seats tend to wear out after a period of time and must be replaced. The problem is particularly pronounced when the valve is used to control the flow of an abrasive fluid and/or when the fluid being controlled has a comparatively high pressure and/or when the valve is used under service conditions which require that the valve be rapidly cycled between open and closed valve positions. To a lesser degree the same problem is present in all fluid flow applications of ball valves. When a seat has become worn or is otherwise no longer capable of performing its intended sealing function, the seat must be replaced to eliminate consequent leakage of fluid through the closed valve. Such seat replacement requires that the valve taken out of service temporarily and, in addition, gives rise to the costs attendant the provision of new seats and associated repair of the valve.

In an effort to deal with the foregoing problem, valve arrangements have been suggested heretofore which reduce seat loading when the valve is in its open position. For example Pryor U.S. Pat. No. 3,064,937 discloses a ball valve which utilizes a permanently split ball consisting of two ball halves that are slidable relative to one another, and associated cam plates cause the ball halves to be forced into the valve seats as the ball is rotated to the valve closed position, and to be moved away from the seats as the ball is rotated to the valve open position. A somewhat analogous arrangement is shown in Sivyer U.S. Pat. No. 3,124,333 wherein a cam, which rides in a split at the bottom of the ball, spreads the ball to form a tighter seal with the valve seats as the ball is rotated to its closed position. Other arrangements utilize plug segments which cooperate with a single seat in the valve, and which are mounted eccentrically on an actuator shaft so that the plug segment is moved into forcible engagement with the associated seat in the closed position of the valve, and moved away from the seat as the segment is moved to the valve open position. Arrangements of this type are shown for example in Zeigler et al U.S. Pat. No. 3,191,906, Pfundstein et al U.S. Pat. No. 3,809,361, Rihm et al U.S. Pat. No. 4,073,473 and Myers U.S. Pat. No. 4,118,008. Rotary valves employing split or axially movable balls are, however, comparatively complicated and expensive to manufacture and maintain. Eccentrically mounted plug segments suffer from the disadvantages that, since they involve an asymmetrical or unbalanced design, they are prone to problems arising from tolerance variations, are not self centering, and are position sensitive rotationally.

The present invention is intended to obviate all of these problems by the provision of a ball of novel configuration which is symmetrical in shape, balanced in design, and so configured that, as the ball is rotated in a substantially conventional valve housing from its open position to its closed position, the ball surface gradually seats on a pair of associated upstream and downstream valve seats to achieve maximum seat loading at the full closed position of ball rotation.

SUMMARY OF THE INVENTION

In accordance with the present invention a ball valve of the aforementioned type is provided with a ball that comprises, in effect, a pair of hemispheroidal bodies of like radius that are integrated with one another and offset from one another relative to the axis of the bore through the ball along a plane that is oriented at substantially 45° to the axis of ball rotation. By reason of the said offset, the outer surface of the ball is shaped to define a pair of diametrically opposed curved shoulders of like configuration that extend along portions of the ball surface between the top and bottom of the ball, with each of said curved shoulders exhibiting a smoothly increasing height relative to the adjacent ball surface in directions away from their respective opposing ends, each of said curved shoulders including a maximum height portion that is disposed adjacent to one end respectively of the bore in the ball. The ball provides straight through flow when it is in its open position, and exerts minimum force against the seats in said open position. As the ball is cycled, i.e., rotated about an axis of rotation through substantially 90°, toward a closed position, its surface contacts the adjacent seat surfaces to an increasingly greater extent with maximum seat loading being achieved at the full closed position of ball rotation.

Inasmuch as the ball shape is symmetrical, and has a balanced design, equal pressure is exerted on the valve seats. Torque is lower for most of the valve cycle. Longer seat life is possible since pressure on the seats is reduced as the ball opens. The ball is not prone to problems from tolerance variations and, instead, is self centering unlike, e.g., butterfly valve disks. Moreover the ball is not position sensitive rotationally, in contrast to eccentric wafer, butterfly, and plug segment valves suggested heretofore. Standard ball valve bodies and seats can be used with the new ball design, and in the closed condition of the valve slight additional rotation of the valve ball increases the seating forces which improves the seal, or reduces leakage, if the valve seats are being damaged or have been damaged by severe service media.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1:
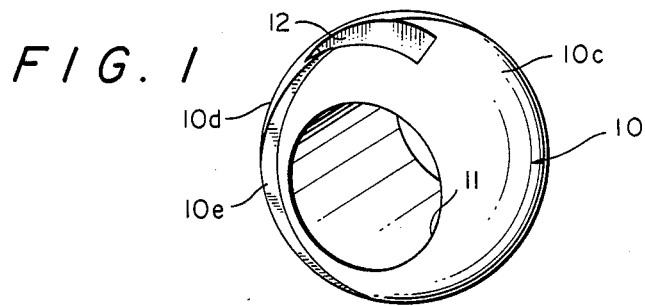
FIG. 1 is a perspective view of a valve ball constructed in accordance with the present invention.
Figure 2A:
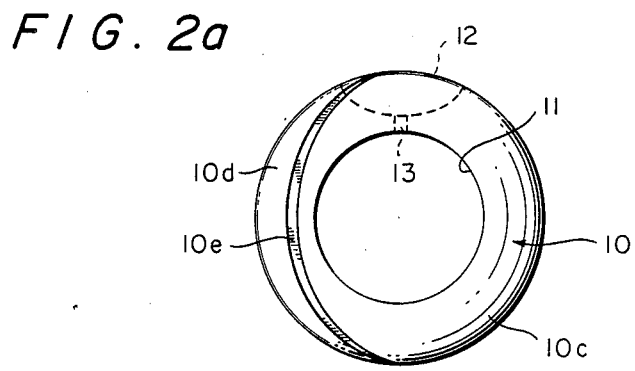
FIGS. 2a, 2b and 2c respectively illustrate an end, side, and top view of the ball shown in FIG. 1.
Figure 2B:
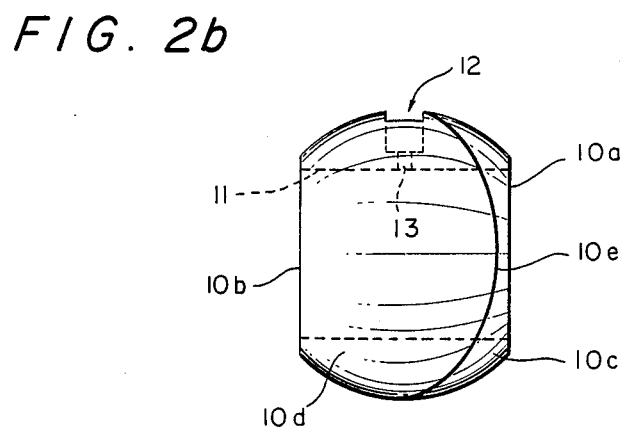
Figure 2C:
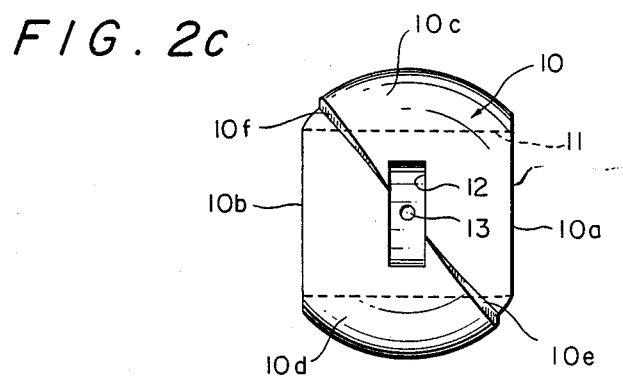

Referring initially to FIGS. 1 and 2a–2c, a ball 10 constructed in accordance with the present invention is of generally spheroidal configuration and has a bore 11 extending therethrough. The ball 10, when installed in a valve housing for fluid control purposes, is intended to be rotated about an axis of rotation that extends at right angles to the axial direction of bore 11, the top of the ball being provided with a recess 12 which is engaged by a stem (e.g., as shown at 50 in FIG. 6) that is used to effect such ball rotation. The ball is truncated at the opposing ends 10a, 10b of bore 11 whereby the width of said ball along bore 11 is less than the height of the ball as best shown, for example, in FIGS. 2b and 2c. A conventional vent hole 13 is provided between bore 11 and stem recess 12.

The ball 10 is of unitary configuration and comprises a pair of hemispheroidal bodies 10c and 10d of like radius that are integrated with one another and offset from one another relative to the axis of the bore along a plane (designated P in FIGS. 3–5) that is oriented at substantially 45° to the axis of bore 11 and at substantially 45° to the axis of rotation of the ball. By reason of this offset, and the hemispheroidal shape of the ball sections 10c and 10d, the exterior surface of the ball has two noncoaxial hemispherical surface portions of like size and shape that are demarcated from one another by a pair of diametrically opposed curved shoulders 10e and 10f that extend along opposite sides of the ball between the top and bottom of the ball. Each of said curved shoulders exhibits a smoothly increasing height relative to the adjacent ball surface in directions away from the top and bottom of the ball respectively, and each of said curved shoulders includes a maximum height portion that is disposed adjacent the opposing ends 10a, 10b of bore 11 respectively.

Figure 3:
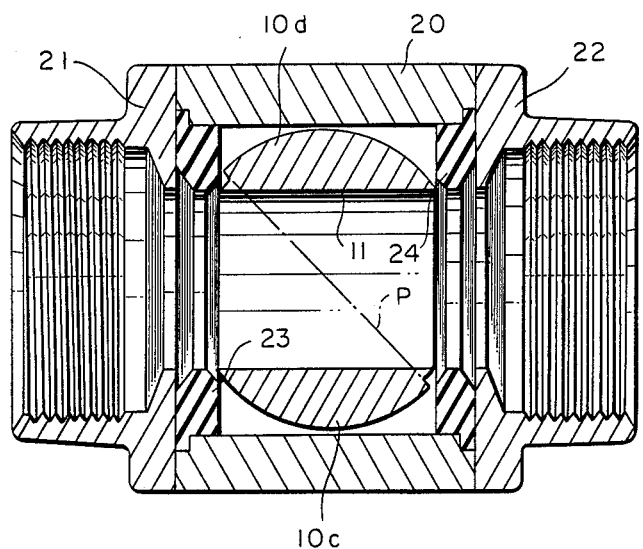
FIG. 3 is a top cross sectional view of a ball valve having a three-piece valve body and containing a ball of the type shown in FIG. 1, with the ball being shown in its open position.
Figure 4:
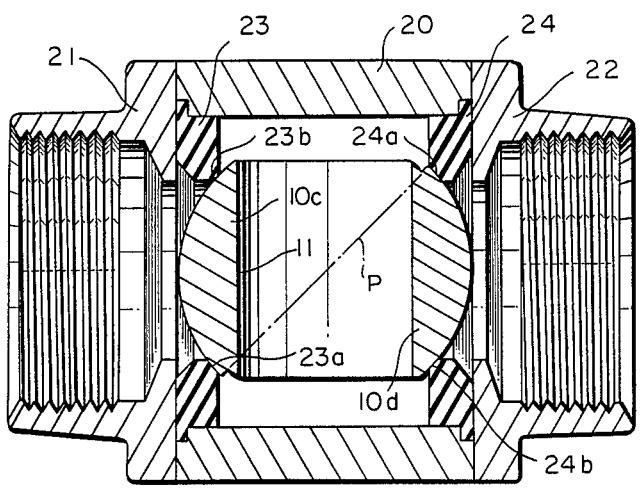
FIG. 4 depicts the valve of FIG. 3 with the ball rotated to its closed position.

FIGS. 3 and 4 depict a ball of the aforementioned type in its open and closed positions respectively, mounted in a three-piece style valve body. The valve body includes a central cylindrical section 20 and a pair of pipe ends 21, 22 which cooperate with one another to define an interior cavity in which the ball 10 is located for rotation by an associated actuating stem (such as stem 50 shown in FIG. 6). The pipe ends 21, 22 define a pair of fluid flow channels which cooperate with the central cavity of the valve to form an axial flow passage that extends through the housing, and the ball is adapted to be rotated through 90° so that its bore 11 is aligned with said axial flow passage as shown in FIG. 3, or disposed transverse to the axial flow passage as shown in FIG. 4, to control the flow of fluid through the valve housing. A pair of annular seat rings 23 and 24 are supported by the housing adjacent the interiors of pipe ends 21, 22 for sealing engagement with the ball when the ball is in its closed position (FIG. 4).

Due to the dimensions of the housing cavity, the ball sections, the offset between the two ball sections and the seat rings illustrated in FIG. 3, the outer surfaces of the hemispheroidal ball sections 10c and 10d are slightly spaced from the adjacent surfaces of seat rings 23, 24 in the open position of the valve. Although this is one possible arrangement which can be employed in the present invention, it has been depicted in FIG. 3 (and in FIG. 5) simply to clarify various aspects of the valve operation. In the preferred embodiments of the present invention the seats 23, 24 are lip-type seats and the dimensions of the aforementioned valve elements are so selected that, in the open position of the valve, the outer surfaces of ball sections 10c and 10d just touch the seats without causing any significant flexure of the seats. This arrangement is preferred since, by so choosing the dimensions of the various valve elements, the valve housing does not have to be provided with separate means for retaining the seats in place when the valve is in its open position. In the open valve position shown in FIG. 3, the ball exerts no force or a minimum force against the seats, and the valve provides straight through flow of the fluid being controlled.

As the ball is cycled toward its closed position, the offset hemispheroidal sections of the ball contact adjacent surfaces of the seats 23, 24 to an increasing extent, with maximum seat loading being achieved in the fully closed position of ball rotation shown in FIG. 4. The amount of offset that is provided between the two ball halves to effect this operation is determined empirically, and is related to the size of the valve. As the size of the valve increases, the extent to which the seats deflect increases and therefore the amount of offset between the two ball halves is also increased.

The arrangements shown in FIGS. 3 and 4 assume that the seats 23, 24 are disposed in coaxial relation to one another and that each seat is oriented at right angles to the axial flow passage through the valve. This particular arrangement is preferred for ease of valve manufacture, since it permits the use of standard valve housings and seat rings. When such an arrangement is employed, however, and as best shown in FIG. 4, the offset hemispheroidal sections of ball 10 contact different portions of the seats to differing extents, e.g., ball section 10d engages a greater portion 24a of seat 24 than portion 24b, and similarly the outer surface of ball section 10c engages a greater portion 23a of seat 23 than portion 23b. Tests conducted on valves constructed in the manner shown in FIGS. 3 and 4 have established that successful sealing is accomplished notwithstanding the differing extents to which the ball surfaces engage the adjacent seats. Uniformity of seat engagement can be accomplished, however, by so configuring the interior of the valve body that seats 23 and 24 are not mounted in coaxial relation to one another, e.g., the position of seat 23 (as depicted in FIGS. 3 and 4) is shifted downward to a slight extent relative to seat 24, or by so shaping and dimensioning the interior flanges of pipe ends 21, 22 that the seats are mounted in the valve body at a slight angle to the axial flow passage and are thereby positioned normal to the surface of the ball when the valve is closed.

Figure 5:
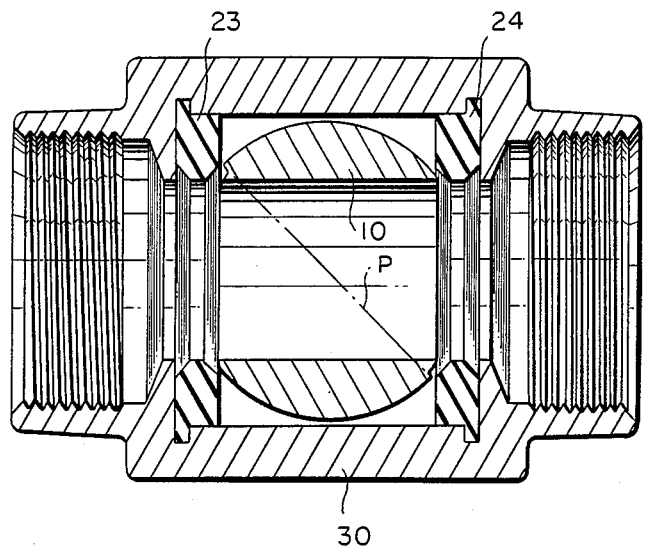
FIG. 5 is a top cross sectional view of a ball valve, similar to that shown in FIG. 3, wherein the ball is mounted in a one-piece ball valve body.

FIG. 5 shows an alternative embodiment of the invention wherein the eccentric ball 10 is disposed between seat rings 23 and 24 in a one-piece ball valve body 30, rather than in a three-piece valve body of the type shown in FIGS. 3 and 4. Such one-piece valve bodies are in themselves well known, and the ball 10 is installed in the valve body by top entry whereafter the top of the interior housing cavity is closed by an appropriate actuator and stem sealing arrangement in conventional fashion. The construction of the ball 10, and the manner in which it cooperates with seats 23, 24 in the open and closed positions of the valve, are the same as those described above by reference to FIGS. 1–4.

Figure 6:
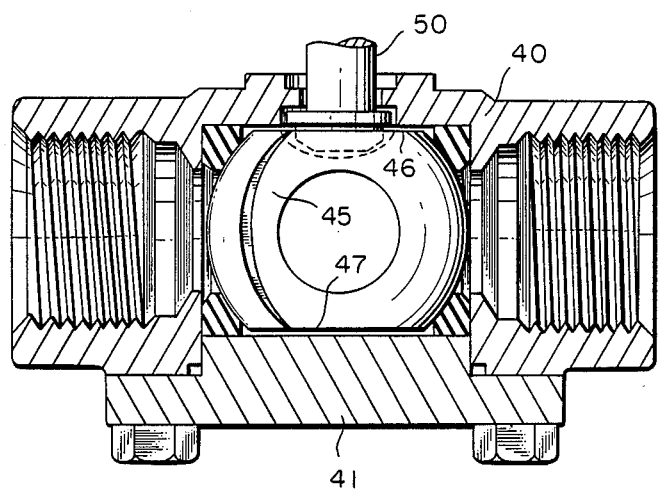
FIG. 6 depicts a flattened ball constructed in accordance with the present invention, disposed for rotation in a valve housing having a flanged cover.

FIG. 6 shows a further embodiment of the invention wherein a valve body 40 is provided with an open bottom for entry of the ball into engagement with stem 50, whereafter the open bottom of the body is closed by a flanged cover 41. The ball 45 is provided with flat top and bottom surfaces 46, 47 to reduce the overall height of the ball, and thereby reduce the overall height of the valve. Ball 45 is otherwise configured in the manner described in reference to FIGS. 1 and 2, i.e., it comprises a pair of hemispheroidal bodies of like radius that are integrated with one another and offset from one another relative to the axis of the bore in the ball along a plane that is oriented at substantially 45° to the axis of ball rotation defined by stem 50. As in the ball 10, the ball 45 exhibits a symmetrical configuration relative to its axis of rotation that comprises two noncoaxial hemispherical surface portions of like size and shape integrated with one another and merging into one another at a pair of diametrically opposed curved shoulders extending along opposite sides of the ball.

Inasmuch as the ball in each of the embodiments described herein is skewed through its center at a 45° angle in relation to its port diameter to form two equal halves offset from one another, the ball has a balanced design. This assures that equal pressure is exerted on the valve seats. There is a certain amount of stem torque as the ball seals into engagement with the associated seats, and it has been found that the stem torque remains constant up to about 75° of the 90° stroke, and then, as the ball engages the seat more, the torque increases; as a result, the torque is lower for most of the valve cycle. Gradual seating is achieved as the ball cams into the seats, and a longer seat life is possible since pressure on the seats is reduced as the ball is rotated to its open position. The ball is self centering, is not prone to problems from tolerance variations and is preferably used in a floating ball arrangement which eliminates the need for trunnion mounting of the ball. The ball configuration is such that it is not position sensitive rotationally. Balls constructed in accordance with the present invention can be mounted in standard valve bodies for cooperation with standard ball valve seats fabricated e.g. of Teflon. Moreover, due to the ball configuration, replacement of partially damaged seats can be deferred for a period of time since, if and when this occurs, the sealing forces exerted between the ball and seats in the closed position of the valve can be increased by slight additional rotation of the ball in the valve closing direction.

While I have thus described preferred embodiments of the present invention, many variations will be apparent to those skilled in the art. It must be understood, therefore, that the foregoing description is intended to be illustrative only and not limitative of the present invention, and all such variations and modifications as are in accord with the principles described are meant to fall within the scope of the appended claims.

Having thus described my invention I claim:

1. In a ball valve of the type comprising a housing having an interior cavity located between and communicating with a pair of fluid flow channels to define an axial flow passage extending through said housing, a ball located in said cavity, said ball having an axially directed bore extending therethrough, said ball being mounted for rotation about an axis of rotation transverse to said flow passage whereby its said bore may be selectively aligned with or disposed transverse to the axial flow passage in said housing to open and close said valve respectively thereby to control the flow of fluid through said axial flow passage, and a pair of annular seat rings supported by said housing in surrounding relation to said axial flow passage adjacent the upstream and downstream sides of said cavity respectively for sealing engagement with said housing and ball, the improvement wherein the exterior surface of said ball has a symmetrical configuration relative to said axis of rotation comprising two noncoaxial hemispherical surface portions of like size and shape that are integrated with one another and offset from one another along a plane that is oriented at substantially 45° to said axially directed bore.

2. The ball valve of claim 1 wherein said pair of annular seat rings have the same inner and outer diameters and are coaxial with one another.

3. The ball valve of claim 1 wherein said two hemispherical surface portions of said ball are in touching engagement with said pair of annular seat rings respectively in the open position of said valve and engage said seat rings with increasing force as said ball is rotated from said open position to said closed position.

4. The ball valve of claim 1 wherein said pair of annular seat rings are oriented at right angles to said axially directed bore when said bore is aligned with said axial flow passage in said housing.

5. The ball valve of claim 1 wherein at least one of said hemispherical surface portions of said ball is spaced from an adjacent one of said seat rings in the open position of said valve.

6. The ball valve of claim 1 wherein the exterior surface of said ball includes at least one flat surface portion that is oriented at right angles to said axis of rotation and parallel to said axially directed bore, said flat surface portion intersecting each of said hemispherical surface portions.

7. The ball valve of claim 6 wherein said valve includes a stem oriented along said axis of rotation for rotating said ball between its said open and closed positions relative to said axial flow passage, said flat surface portion including a recess for separable engagement with one end of said stem.

8. The ball valve of claim 7 wherein the exterior surface of said ball includes a further flat surface portion disposed in spaced parallel relation to said first-mentioned flat surface portion remote from said stem.

9. A ball of balanced design for use in a ball valve of the type wherein the valve is opened and closed by rotation of the ball about an axis of rotation, said ball having a bore extending axially therethrough transverse to said axis of rotation, and the outer surface of said ball comprising a pair of three-dimensionally curved surface portions of like shape and size that are disposed symmetrically to one another relative to said axis of rotation and offset from one another to define a pair of curved shoulders of like configuration that extend along diametrically opposed portions of said outer ball surface, each of said curved shoulders exhibiting a smoothly increasing height relative to the adjacent ball surface in directions away from the opposing ends of said curved shoulder, and each of said curved shoulders including a maximum height portion disposed adjacent to one end respectively of said bore.

10. The ball of claim 9 wherein said three-dimensionally curved surface portions are the outer surfaces of a pair of hemispheroidal bodies of like radius that are integrated with one another and offset from one another relative to the axis of said bore.

11. The ball of claim 10 wherein said pair of hemispheroidal bodies are offset from one another along a plane that is oriented at substantially 45° to said axis of said bore.

12. A ball of balanced design for use in a ball valve of the type wherein the valve is opened and closed by rotation of the ball, relative to a pair of spaced annular seat ring mounted in a valve housing, through substantially 90° about an axis of rotation that extends through said ball between diametrically opposed first and second points on the outer surface of said ball, said ball being of generally spheroidal configuration and having a bore extending axially therethrough at right angles to said axis of rotation, said ball being truncated at the opposing ends of said bore whereby the width of said ball along said bore is less than the height of said ball between said first and second points, and the outer surface of said ball consisting of two three-dimensionally shaped surface portions that are integrated with and offset from one another to define a pair of diametrically opposed curved shoulders of like configuration that extend along opposite sides of said ball between the top and bottom of said ball.

13. The ball of claim 12 wherein said ball comprises a pair of hemispheroidal bodies of like radius that are integrated with one another and offset from one another relative to said axis of rotation, said three-dimensionally shaped surface portions being the outer surfaces of said hemispheroidal bodies.

14. The ball of claim 3 wherein said pair of hemispheroidal bodies are offset from one another along a plane that is oriented at substantially 45° to said axis of rotation.

* * * * *